May 9, 1944. W. J. RADY 2,348,263
REGULATOR FOR AUTOMOTIVE GENERATORS
Filed March 20, 1942 4 Sheets-Sheet 1

INVENTOR
William J. Rady
BY
Spencer, Hardman & Fehr
HIS ATTORNEYS

May 9, 1944.    W. J. RADY    2,348,263
REGULATOR FOR AUTOMOTIVE GENERATORS
Filed March 20, 1942    4 Sheets-Sheet 2
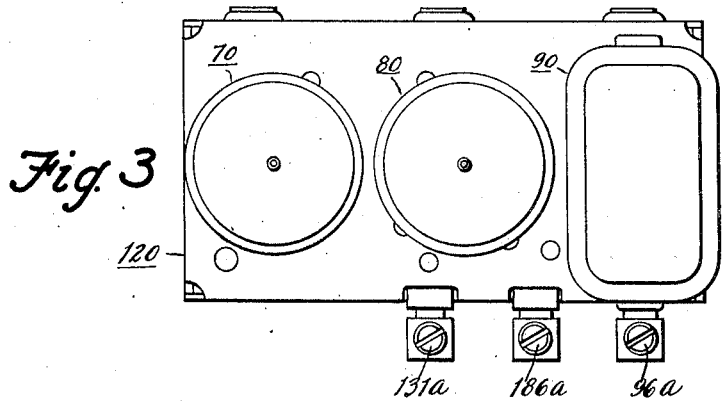
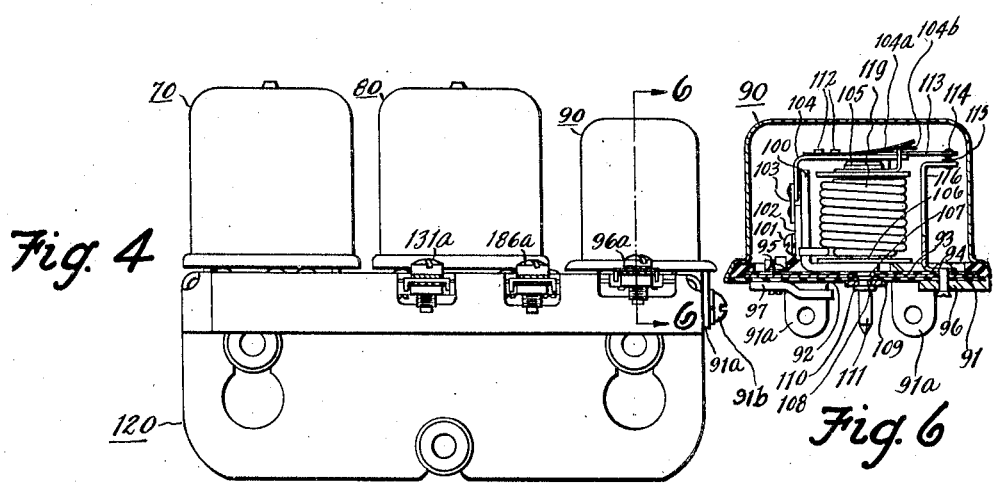
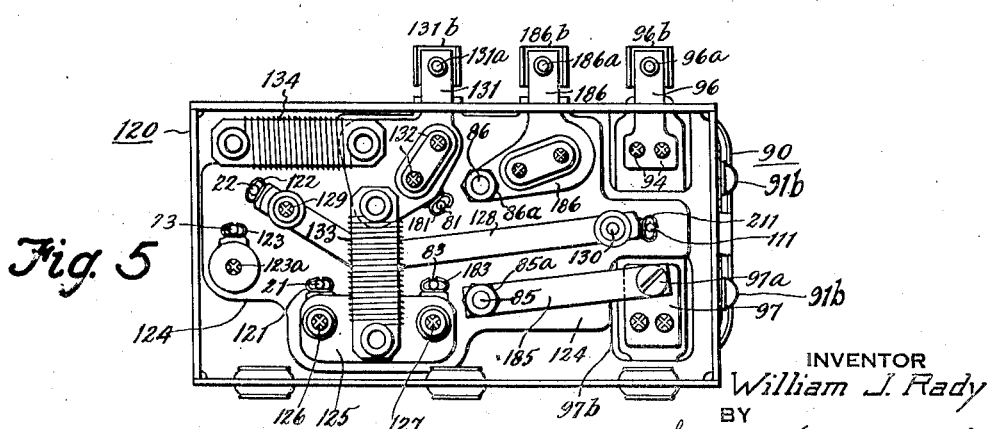
INVENTOR
William J. Rady
BY
Spencer, Hardman & Fehr
HIS ATTORNEYS INVENTOR
William J. Rady
BY
Spencer, Hardman & Fehr
HIS ATTORNEYS May 9, 1944. W. J. RADY 2,348,263
REGULATOR FOR AUTOMOTIVE GENERATORS
Filed March 20, 1942 4 Sheets-Sheet 4

INVENTOR
William J. Rady
BY
Spencer, Hardman & Fehr
HIS ATTORNEYS

Patented May 9, 1944

2,348,263

UNITED STATES PATENT OFFICE 2,348,263

REGULATOR FOR AUTOMOTIVE GENERATORS

William J. Rady, Anderson, Ind., assignor to General Motors Corporation, Detroit, Mich., a corporation of Delaware Application March 20, 1942, Serial No. 435,560

3 Claims. (Cl. 320—69)

This invention relates to apparatus for controlling the circuit between the storage battery and the generator and for regulating the generator. The circuit connections are controlled by the reverse current relay which closes when the generator voltage exceeds the battery voltage and disconnects the generator from the battery when the generator voltage falls below the battery voltage. The generator is regulated by a voltage regulator, or by a voltage regulator and a current regulator. The relay and the regulator or regulators are assembled together on a single mounting bracket.

One object of the present invention is to provide for the facile mounting of the regulator and relay units upon the mounting bracket and for connecting these units into the battery charging system. In order to accomplish this object I provide the relay and regulator units with plug terminals adapted to be received by sockets in the mounting base. These plug and socket connections are adequate for carrying all currents of the system with the exception of the battery charging current. The connections which are required to carry battery charging current are made by terminal screws. In the case of the voltage regulator all of the connections are made with plugs and sockets. In the case of the current regulator two of the connections are with plugs and sockets and two are made by threaded studs carried by the regulator and project in the apertured conductors carried by the mounting bracket. In the case of the relay its voltage connection with the mounting bracket is made by plug and socket and its battery and generator connections are made with the use of screws. In this way the regulating units and the relay unit may be readily detached from the bracket whenever replacements are required.

Further objects and advantages of the present invention will be apparent from the following description, reference being had to the accompanying drawings wherein preferred embodiments of the present invention are clearly shown.

Fig. 3 is a plan view of an instrument unit comprising a mounting base, a voltage regulator, a current regulator and a relay as shown diagrammatically in Fig. 1;

Fig. 4 is a side view thereof;

Fig. 5 is a bottom view thereof;

Fig. 6 is a sectional view on line 6—6 of Fig. 4;

Figure 1:
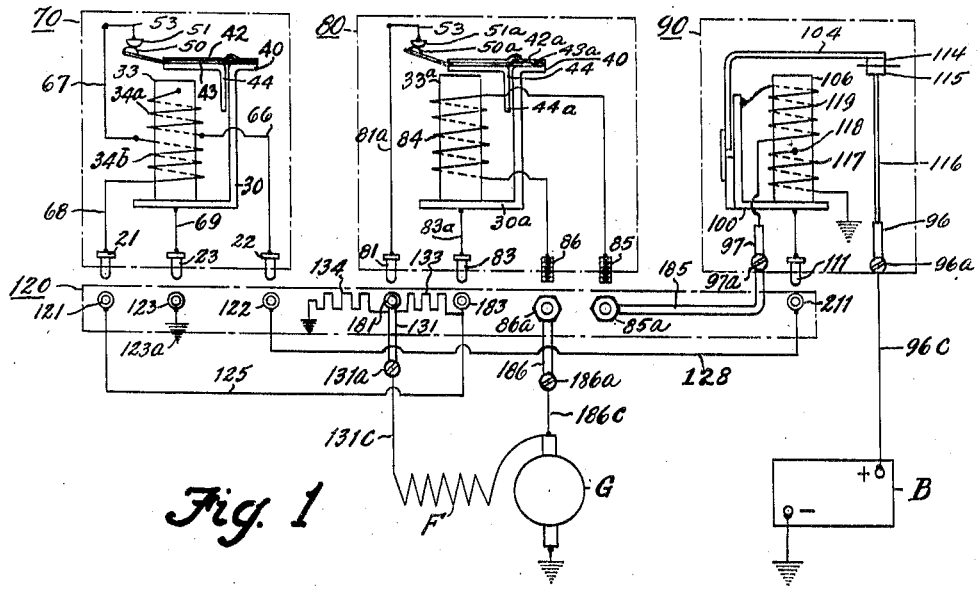
Fig. 1 is a wiring diagram of a battery charging system including an instrument assembly comprising a mounting base, a voltage regulator, a current regulator, and a reverse current relay.
Figure 2:
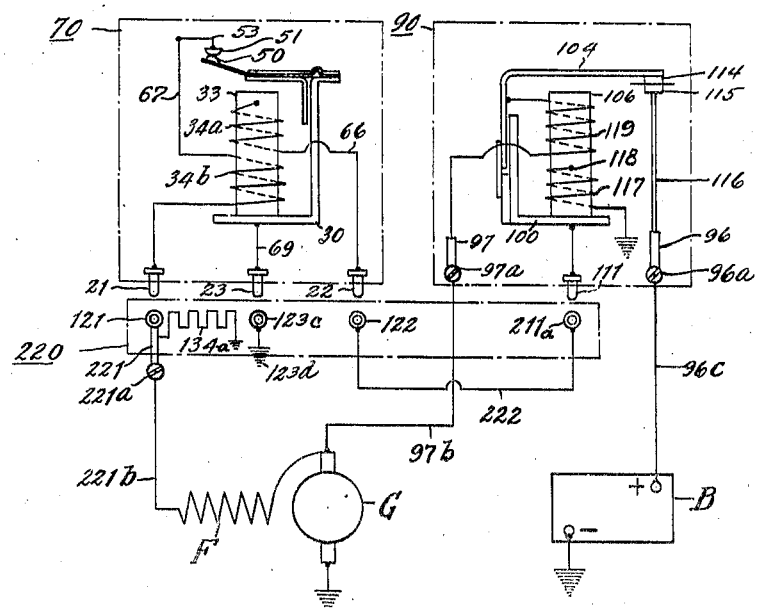
Fig. 2 is a wiring diagram of a battery charging system including an instrument unit comprising a mounting base, a voltage regulator, and a reverse current relay.
Figure 7:
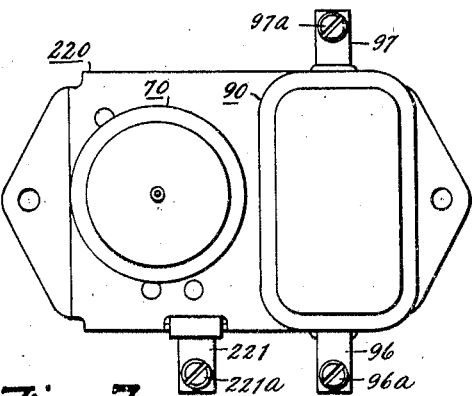
Fig. 7 is a plan view of an instrument assembly comprising a mounting base, a voltage regulator and a relay, as shown diagrammatically in Fig. 2.
Figure 11:
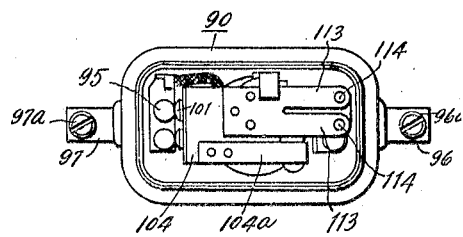
Fig. 11 is a plan view of the relay shown in Fig. 10.
Figure 8:
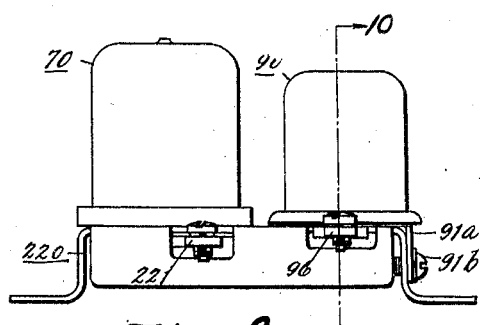
Fig. 8 is a side view thereof.
Figure 10:
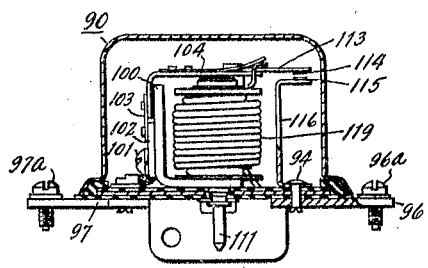
Fig. 10 is a sectional view taken on the line 10—10 of Fig. 8 and showing a reverse current relay.
Figure 13:
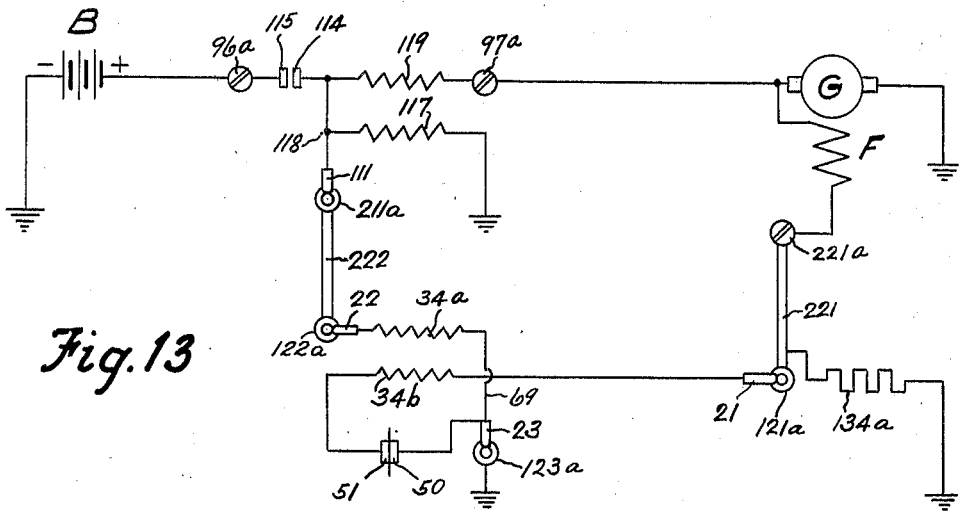
Figure 14:
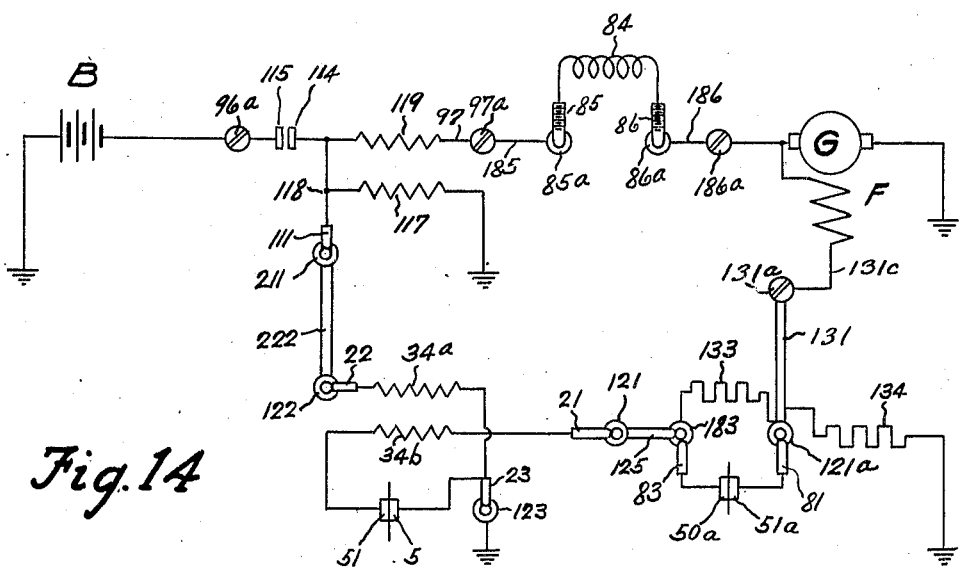

Figs. 13 and 14, respectively, are simplified diagrams of the circuits shown in Figs. 1 and 2, respectively.

The voltage regulator will first be described with reference to Figs. 1 and 5. The base of the regulator, not shown, includes a sheet of hard insulating material through which three plug terminals 21, 22 and 23 project and are spaced in a manner as shown in Fig. 5. As shown diagrammatically in Fig. 1, the regulator magnet and contact assembly comprises an L-shaped magnetizable bracket 30 one leg of which supports a magnet core 33. The other leg is provided with ears 40 to which are attached leaf spring blades or leaves 42 and 43 carrying an armature 44.

The blade 43 has its free end inclined upwardly away from the armature 44 and carries a contact 50 having a spherical face for engaging a face of a contact 51. The contact 51 is resiliently supported, in any suitable manner, relative to the contact 50 so as to have a wiping action between them before they are separated and also after they are brought together. This wiping action assists in keeping the contact surfaces in good condition.

The winding of the voltage regulator comprises a generator voltage responsive coil 34a and a field current carrying coil 34b, as shown at the left of Fig. 1. One end of coil 34a is connected to core 33, the other end with a wire 66 which is connected with the terminal 22. The coil 34b is connected by a wire 67 with a bracket, indicated by reference character 53, carrying the contact 51. The other end of the coil 34b is connected by a wire 68 with plug 21. The frame 30 is connected by a lead 69 with plug 23. The regulator in its entirety is designated by numeral 70. In Fig. 1 the unit is represented by the parts included with the dot-dash rectangle 70.

The current regulator designated in its entirety by numeral 80 is like the voltage regulator 70 in many respects. Where the parts of the current regulator are exactly like those of the voltage regulator similar reference numerals with the character "a" added have been used to designate the similar parts. The current regulator differs from the voltage regulator in that a core 33a is surrounded by one magnet coil 84 of relatively coarse wire having its ends connected respectively with threaded terminal studs 85 and 86. The regulator magnet and contact assembly comprises the L-shaped magnetizable bracket 30a one leg of which supports a magnet core 33a. The other leg is provided with ears 40a to which are attached leaf spring blades or leaves 42a and 43a carrying an armature 44a. Plug 83 is connected by a wire 83a with frame 30. Plug 81 is directly connected by wire 81a with bracket 53 which carries contact 51.

The contacts of either regulator control the opening and closing of a short-circuit around a resistance unit in the field circuit of the generator to be controlled.

The regulator units 70 and 80 are adapted to be associated with reverse current relay 90 with reference to Fig. 1 and Fig. 6. The relay 90 comprises a metal base 91 located between an insulating plate 92 on the underside and an insulating plate 93 on the upper side. These plates together with the metal base 91 are secured together by rivets 94 and 95 which also serve to attach terminal plates 96 and 97 respectively. Against the insulating plate 93 is located a magnetizable frame 100 to which is secured an armature assembly spaced apart by a member 102 and secured together by a screw 101. A flexible metal hinge 103 is riveted to the plate member 102 and an L-shaped magnetizable armature 104 having a portion overlying a pole piece 105 of a core 106 which serves to attach the frame 100 to the assembly of plates 91, 92 and 93. For this purpose the core 106 is provided with a portion of reduced diameter 107 extending through the plates 93 and 91 and merging with a portion of still further reduced diameter 108 extending through a washer 109. The portion 108 is circularly staked at 110 to confine the parts 100, 93, 91 and 92 between the main portion of the core 106 and the washer 109. The lower portion 111 of core 106 provides a plug connection for the relay 90. Rivets 112 connect the armature 104 with the left end of a leaf spring 113 carrying a contact 114 for engaging a contact 115 carried by a bracket 116 connected by the rivet 94 with terminal plate 96. The core 106 is surrounded by a voltage coil 117 connected at 118 with core 106 which is connected with plug 111. The other end of coil 117 is grounded by connecting it with the plate 91. The plate 92 is grounded by providing it with integral ears 91a adapted to be electrically connected with the mounting bracket 120. The downward movement of the armature 104 toward the pole 105 is resisted by leaf spring 104a. Attached at its left end to the armature 104 and bearing against its right end is a bendable sheet metal stock 104b supported by the magnet core 106. The core 106 is surrounded by a coil 119 having one end connected with the frame 100 and the other end connected to a rivet 95 and therefore with terminal plate 97.

The regulators 70 and 80, and relay 90 are adapted to be mounted together upon a mounting bracket 120 supporting socket members 121, 122 and 123 respectively for receiving the plugs 21, 22 and 23 of the voltage regulator 70. Plugs 21, 22 and 23 extend through snugly fitting holes in insulating plate 124 secured against the underside of bracket 120. Sockets 121 and 122 are insulated from each other and from the bracket 120 and socket 123 is electrically connected with the bracket 120 by rivet 123d. Socket 121 is connected with socket 183 for receiving plug 83 of current regulator 80 by a metal plate 125. Plate 125 is secured to the bracket 120 by rivets 126 and 127, but insulated therefrom. Socket 122 is connected by a strap 128 with socket 211 for receiving plug 111 of relay 90. Strap 128 is secured to mounting bracket 120 by rivet 129 and rivet 130 but is insulated from the bracket. Plug 81 of current regulator 80 is received by socket 181 electrically connected with terminal plate 131 secured to bracket 120 by rivets 132 but insulated therefrom. Resistance 133 controlled by the contacts of the current regulator 80 is connected between plate 125 and plate 131. Resistance 134 controlled by the contacts of voltage regulator 70 is connected between the plate 131 and grounded by the mounting bracket 120. The threaded stud terminal 86 of regulator 80 passes through a hole in terminal plate 186 and receives a nut 86a for securing stud 86 to plate 186. Threaded stud 85 of the regulator 80 passes through a hole in strip 185 and is secured thereto by a nut 85a. Strip 185 is connected by a screw 97a with terminal plate 97 of relay 90, said plate being made accessible by providing the mounting bracket 120 with an aperture 97b. A screw 96a cooperates with a washer 96b and terminal plate 96 of relay 90 to connect the plate 96 to a wire 96c, Fig. 1, connected with a washer 186b to connect to the plate 186 with a wire 186c connected with one of the main terminals of generator G, the other main terminal being grounded. A screw 131a cooperates with a washer 131b to secure to the plate 131 with a wire 131c connected with the field winding F of generator G. The holes in the metal mounting bracket 120 are spaced according to the required spacing of plugs 21, 22, 23, 81, 83, 111 and the threaded studs 86 and 85 and provide clearance so that no electrical connection is made between the mounting bracket and any of these connectors. The holes in the insulating plate 120 are similarly spaced but these holes closely fit the plug or stud connectors and thus guide the connectors into their proper sockets or holes in conducting plates.

The voltage regulator 70 is mechanically disconnected from the mounting bracket and electrically disconnected from the sockets carried thereby by pulling the regulator away from the mounting bracket. There are no nuts to be loosened. The contact pressure between the sockets and the plugs of the voltage regulator is sufficient to carry the small amount of current required to be carried across these parts.

Before the current regulator 80 can be mechanically disconnected from the mounting bracket and electrically disconnected from the socket and conducting plates thereof, the nuts 85a and 86a must be removed from the studs 85 and 86.

Before the relay 90 can be mechanically disconnected from the mounting bracket and electrically disconnected from the single socket carried thereby the screw 97a must be removed.

From the foregoing it is apparent that the disconnection of the voltage regulator requires no removal of screws or nuts; the disconnection of the current regulator requires removal of but two nuts; and the removal of the relay requires only the removal of one screw. To replace the relay 90, however, it must be disconnected from the battery by unscrewing the nut 96a. It is, therefore, apparent that the removal of the instrument for a replacement thereof is greatly facilitated.

Figure 9:
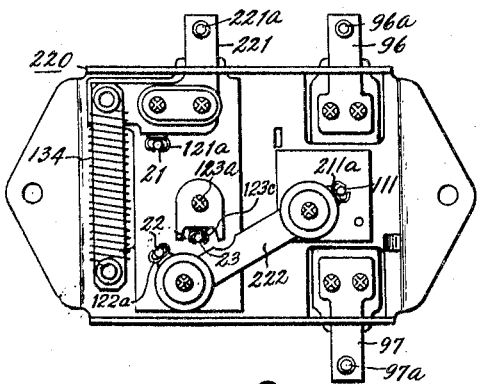
Fig. 9 is a bottom view thereof.
Figure 12:
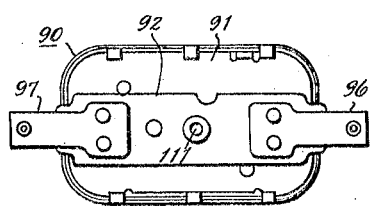
Fig. 12 is a bottom view thereof.

In an instrument assembly comprising a voltage regulator 70 and a cut-out relay 90 and a mounting bracket 220, the arrangement of the sockets 121a, 122a and 123c for receiving the plugs 21, 22 and 23 of the voltage regulator is the same as has been described. On referring to Fig. 9 it will be seen that socket 121a is electrically connected with terminal plate 221, connected by screws 221a and wire 221b with field F of generator G. The voltage regulator resistance 134a is connected between plate 221 and ground provided by bracket 220. Socket 123c is grounded by the attached rivet 123d. Socket 122a is connected by a strap 222 with the socket 211a which receives plug 111 of the relay 90. The terminal plate 97 of the relay 90 extends outwardly in Fig. 9 which is to receive screw 97a by which a wire 97b is used to connect a terminal of generator G. In the combination shown in Fig. 2 the voltage regulator and the relay 90 can be removed from the mounting bracket 220 without first removing any screws or nuts. However, the relay can not be disconnected from the leads to the generator and battery without first loosening the screws 96a and 97a.

From the foregoing it will be seen that when the instrument assembly is connected between the battery B and the generator G the electrical circuits and connections for a voltage regulator and a reverse-current relay is best shown in the simplified diagram Fig. 13. The diagram shows the voltage regulator 70 having a first terminal 21 connected with the generator field F, a second terminal 22 connected with the generator-line and a third terminal 23 connected with ground. The magnet coil 34a of the voltage regulator is connected between the second terminal 22 and the third terminal 23. A pair of regulating contacts 51 and 50 controlled by the magnet coil 34b are connected between the first terminal 21 and the third terminal 23.

The reverse current relay 90 has its first terminal 96a connected with the battery, the second terminal 97a connected with the generator and a third terminal 111 connected with the second terminal 22 of the voltage regulator. A series circuit is provided between the first and second terminals of the reverse current relay, this circuit includes a pair of normally open contacts 114 and 115 and a series magnet coil 19, the contact 115 being permanently connected with the first terminal 96a and the other contact 114 is connected through the magnet coil 119 to the terminal 97a. Another circuit is connected with the second terminal 97a, said circuit including parallel circuits, one of which includes a shunt magnet coil 117 of the relay and grounded on the frame of the relay 90, and the other circuit is connected with the third terminal 111 of the relay.

The metal base 220 upon which the regulators and relay is mounted provides the ground connection with the battery, this base is engaged by the metal frame of the relay. The base supports a plurality of sockets for receiving the three terminals of the voltage regulator, the engagement of the sockets with the terminals of the regulator. The engagement of the terminal of the regulator with the sockets provides the detachable mounting for regulator upon the base. The socket 123a receives the terminal 23 of the regulator, said socket being grounded to the base. The base provides a socket 211a for the third terminal 111 of the reverse current relay and an electrical connection 222 which is between the socket 211a and the socket 122a for the second terminal 22 of the voltage regulator. The base provides a terminal 221a for making connection with the field winding F of the generator and a connection 221 is located between the terminal 221a and the socket 121a for the first terminal 21 of the voltage regulator. The base also supports a resistance unit 134a grounded through the base. The resistance unit 134a is connected with the connection 221.

Fig. 14 shows another simplified diagram similar to Fig. 13 including a current regulator with a magnet coil 84 to be inserted in the battery charging circuit and has screw terminals 85 and 86 connected with the ends of the coil 84. A pair of regulating contacts 50a and 51a are controlled by the coil 84. The contact 51a is connected with the terminal 81 and contact 50a with terminal 83. The base 220 is provided with sockets 85a and 86a respectively of the magnet coil 84 of the current regulator. A connection 185 connects the socket 85a with the terminal 97a of the reverse current relay and a connection 186 connects the socket 86a with the generator terminal 186a on the base 220. The socket 86a receives a magnet coil terminal of the current regulator and sockets 121a and 183 respectively for receiving the current regulator contact terminals 81 and 83. A resistance unit 133 is connected at its ends to the sockets 181 and 183, the socket 181 being directly connected with the connection 131 to the generator field terminal on the base and the socket 183 being electrically connected with the socket 121 which receives the terminal 21 of the voltage regulator. The sockets 121 and 183 are interposed in the connections provided by the base between the socket 121 which receives the terminal of the voltage regulator and the resistance unit 134 of the voltage regulator and the generator field terminal 131a provided by the base.

While the embodiment of the present invention as herein disclosed, constitutes a preferred form, it is to be understood that other forms might be adopted, all coming within the scope of the claims which follow.

What is claimed is as follows:

1. An instrument assembly for use in a battery charging circuit including a generator and a storage battery comprising a voltage regulator, a cut-out relay and a base for supporting the regulator and relay and for making electrical connections therewith said base being one of a plurality of bases with which the voltage regulator and cutout relay may be used; said regulator having a pair of normally closed contacts for by-passing a generator field resistance, an armature for separating the contacts, an electromagnet for attracting the armature and having a main voltage responsive winding and a generator field current carrying winding, and having a circuit comprising a first plug and the field current winding and the contacts and a second plug, and having a circuit comprising the second plug and the voltage responsive winding and a third plug; said cutout relay having a pair of normally open contacts, an armature for closing them and an electro-magnet for attracting the armature having a current coil in series with the contacts, and having a generator voltage responsive coil, and having terminals for connecting the contacts and current coil into the battery charging circuit and having a plug connected in parallel with the voltage coil; said base carrying a terminal connected with the generator field, a resistance connected with the field terminal and with ground, and carrying first, second, third and fourth connector sockets for receiving, respectively, the first, second and third plugs of the voltage regulator, and the plug of the cut-out relay, and carrying means for connecting the first socket with the field terminal carried by the base, means for connecting the second socket with ground, and means for connecting the third and fourth sockets.

2. The instrument assembly as defined by claim 1 further characterized by the addition of a current regulator having normally closed contacts, an armature for separating them and an electromagnet for attracting the armature and having a current responsive winding, and having plugs connected, respectively, with the contacts and having terminals connected, respectively with the ends of the magnet winding; said base carrying the parts recited in claim 1 and the following in addition thereto: means for making connection with the current regulator magnet coil terminals and for connecting said coil into the battery charging circuit; a fifth socket and a sixth socket for receiving, respectively, the plugs of the current regulator, a second resistance connected between the fifth and sixth sockets, means for connecting the fifth socket directly with generator field terminal of the base, and a connector between the first and sixth sockets, the second resistance, the current regulator contacts and the fifth socket providing the means for connecting the first socket with the field terminal provided by the base.

3. A mounting support in combination with a plurality of electrical responsive devices for controlling a circuit from a generator to a battery comprising a support; a first group of conducting strips fixed to the support and having spaced yieldable sockets for receiving easily removable terminal plugs provided by the devices; a second group of conducting strips fixed to the support; interengaging means provided by at least one of the devices and the second group of conducting elements whereby said specified one device is normally prevented from removal from the support; and means for securing the specified one device in a fixed assembled relation; said devices when assembled in their respective positions being capable of controlling the electrical circuit from the generator to the battery.

WILLIAM J. RADY.